Patented May 9, 1950

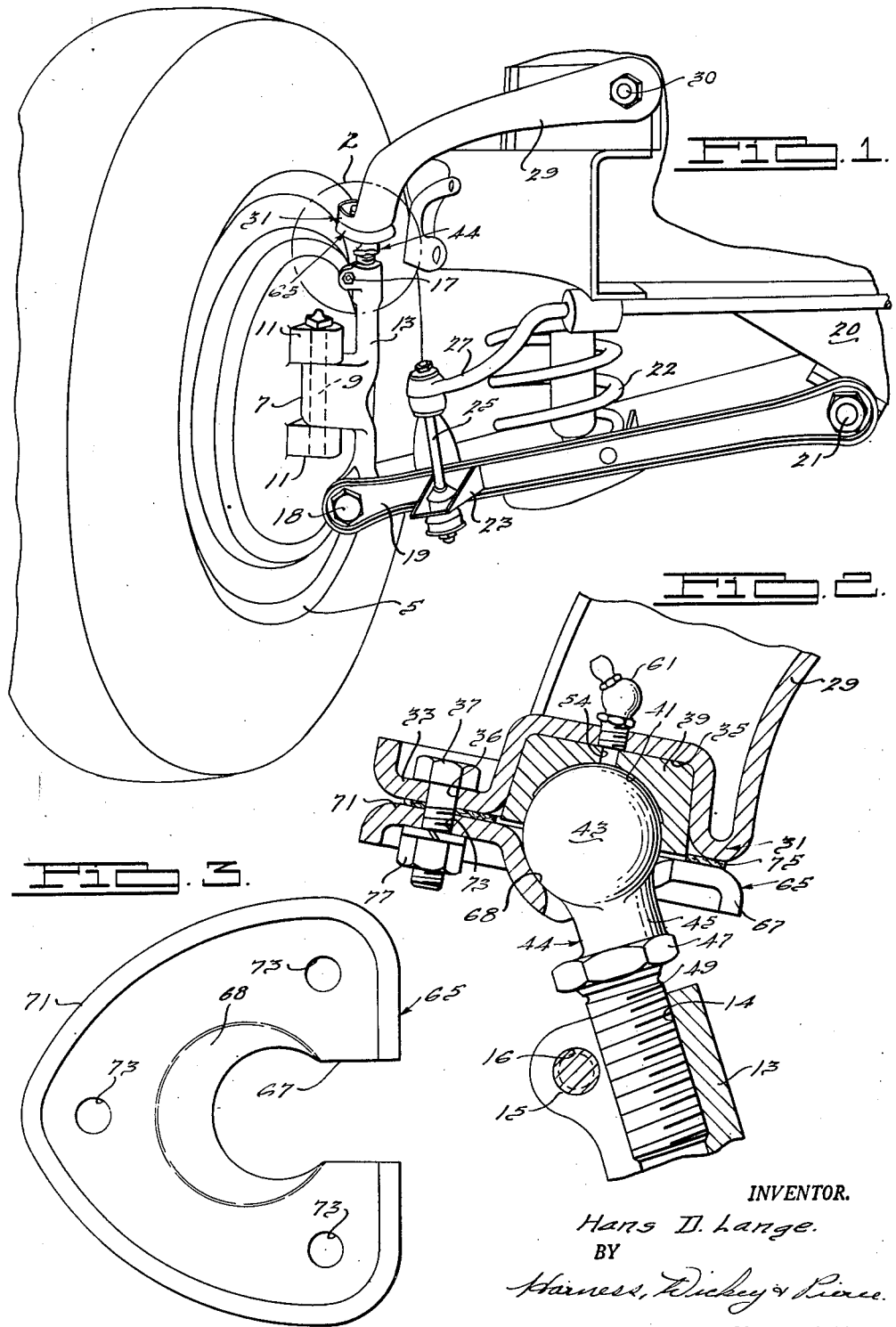

2,507,108

UNITED STATES PATENT OFFICE 2,507,108

WHEEL SUSPENSION

Hans D. Lange, Chelsea, Mich., assignor, by mesne assignments, to Kaiser-Frazer Corporation, Willow Run, Mich., a corporation of Nevada Application October 11, 1946, Serial No. 702,859

1 Claim. (Cl. 280—96.2)

This invention relates generally to motor vehicles and more particularly to an individual wheel suspension therefor.

It is an object of this invention to provide, in an individual wheel suspension of the type having upper and lower horizontal suspension arms and an interconnecting wheel mounting member, an improved manner of obtaining the proper caster and camber setting for the wheels.

It is a further object of this invention to provide, in an individual wheel suspension of the type having upper and lower horizontal suspension arms and a vertical wheel mounting member, a novel ball type pivotal connection between said wheel mounting member and said upper suspension arm for obtaining the proper caster and camber setting of the wheel.

These and other objects of this invention will become apparent from the following detailed description taken in conjunction with the accompanying drawing in which:

Figure 1 is a perspective view of an individual wheel suspension embodying features of this invention;

Fig. 2 is an enlarged, vertical cross-sectional view of the pivotal connection between the upper suspension arm and the wheel mounting member taken within the circle 2 of Figure 1.

Fig. 3 is a bottom plan view of the ball head retaining member.

Referring to the drawing, it will be seen that a conventional vehicle wheel 5 is pivotally connected to a wheel knuckle 7 by means of a king pin 9 supported in the wheel by spaced lugs 11. On the inner end of the knuckle 7 is a supporting arm 13 which extends vertically above and below the knuckle and integral therewith. The upper end of the arm 13 has a tapped opening 14 formed therein and likewise is split longitudinally and provided with laterally extending ears 15 which have aligned apertures 16 passing therethrough for receiving a bolt 17 therethrough.

The lower end of the supporting arm 13 is pivotally connected by a bolt 18 to the outer end of a wishbone type lower suspension arm 19 which has its inner end pivotally connected to the vehicle frame 20 by means of a bolt 21. A coil spring 22 is seated in the pan of the suspension arm 19 and has its opposite upper end abutting against the vehicle frame. The lower suspension arm likewise carries a bracket 23 on which is mounted a torsional arm 25 which in turn is connected at its upper end to one end of an antisway bar 27 in a conventional manner.

An upper suspension arm 29 is pivotally connected to the vehicle frame 20 by a bolt 30 and extends substantially horizontally therefrom outwardly toward the wheel whereupon it is bent downwardly to have its lower end substantially aligned with the axis of the supporting arm 13. The lower end of the upper suspension arm 29 is then connected pivotally to the upper end of the supporting arm 13 as will be hereinafter described and which constitutes the principal features of the present invention.

The lower end of the upper suspension arm 29 is formed with a cup-shaped recess 35 having a horizontal flange generally indicated at 31 which projects laterally therefrom and forms channel 33. Channel 33 faces upwardly and has three radially spaced, vertical apertures 36 passing therethrough which receive three bolts 37 for a use which will be hereinafter described. The inner channel section 35 has a bearing block 39 mounted therein which is provided with a downwardly facing ball-shaped recess 41 which is adapted to receive a ball head 43 therein of a vertically disposed connecting member 44.

Below the ball head 43, the connecting member 44 is formed with a neck portion 45 which has a hexagonal grip 47 on the lower end thereof adapted to receive a tool for turning the member 44. The connecting member 44 has a downwardly extending threaded stem 49 whose axis is eccentric to the axis of the neck 45 so that rotation of the stem 49 effects an eccentric rotation of the ball head 43.

The threaded stem 49 is threaded into the supporting arm recess 14 to the desired angular position of the ball head 43 to get the proper caster and camber setting and then locked against rotation at this setting in the supporting arm 13 by tightening the bolt 17.

A vertical aperture 54 passes through the bearing block 39 and the channel section 35 and communicates with the ball recess 41. The portion of the aperture passing through the channel section 35 is internally threaded to receive a grease fitting 61 for lubricating the ball recess 41 and ball head 43.

In order to maintain the ball head 43 in an abutting relation with the ball recess 41, a generally cup-shaped retaining member 65 is provided which has an open throat 67 therein adapted to slidably receive the neck portion 45 of the connecting member 44. Adjacent to the open throat 67, the member 65 is formed with a radial indentation 68 which contacts the lower portion of the ball head 43. The retaining member 65 is formed with surfaces complementary to the adjacent faces of the suspension arm horizontal flange 31 and outwardly of the radial indentation 69 has a channel section 71, the upper surface of which abuts against the lower surface of the channel portion 33. Three vertical apertures 73 pass through the channel section 71 and are aligned with the apertures 36 in the channel portion 33 for receiving the bolts 37. A seal 75 is positioned between the horizontal flange 31 and the complementary surfaces of the cup-shaped member 65 for preventing the leakage of lubricant therefrom. A nut 77 is threaded on the end of each bolt 37 for securing the suspension arm and cup member together and compressing the seal between the same.

It will be noted that the connecting member can be turned 360° and in order to obtain the proper caster and camber setting for the wheel it is necessary to select the proper quadrant for the axis of the threaded stem 49 of the connecting member 44. This is accomplished by turning the hexagonal portion 47 which sets the arm 13 at the proper caster and camber angles, due to the fact that the axis of threaded stem 49 is eccentric to the axis of the neck portion 45, and likewise due to the fact that the threaded stem 49 is rigidly locked to the knuckle supporting arm 13 by the bolt 17 therein. The caster and camber adjustment is permitted within its limits through the connection between the lower end of the arm 13 and the frame. When the hexagonal portion 47 is turned, the ball head will rotate about its center in the bearing block 39, but the axis of the threaded stem being eccentric thereto will cause the entire knuckle supporting arm 13, the knuckle 7 and the wheel 5 to be moved to the proper caster and camber setting.

This provides a simple and speedy means for setting the caster and camber for each of the wheels and the eccentricity of the threaded stem to the ball head is sufficiently great to allow the proper caster and camber setting to be made.

While only one particular embodiment of this invention has been described, it is to be understood that it is not to be restricted thereto, and that I intend to cover all modifications thereof which will be apparent to one skilled in the art and which come within the spirit and scope of the appended claim.

I claim:

In a vehicle independent wheel suspension, a vehicle frame, a vertically disposed wheel mounting member, a suspension arm having one end thereof adapted to be pivotally connected to said vehicle frame and the other end thereof having a ball-shaped recess therein, a connecting member having a ball-shaped head on one end thereof pivotally mounted in said arm ball recess, means retaining said ball head in said recess including a generally cup-shaped retainer connected to said suspension arm, a threaded stem on the opposite end of said connecting member from said ball head, said ball head being eccentrically positioned with respect to the longitudinal axis of said threaded stem, said wheel mounting member having an internally threaded recess at one end thereof receiving said threaded stem and engaging the same throughout the majority of its length, whereby turning of said connecting member varies the caster and camber setting of said wheel mounting member, the wall of said member recess being longitudinally split, means releasably clamping the split portions of said recess wall for locking said threaded stem against rotation within said recess, and means formed on the outer periphery of said stem intermediate said ball head and said threaded end for receiving a tool for turning said connecting member so as to vary the caster and camber setting of the wheel mounting member.

HANS D. LANGE.

REFERENCES CITED

The following references are of record in the file of this patent:

UNITED STATES PATENTS

| Number | Name | Date |
|---|---|---|
| Re. 19,482 | Baker | Mar. 5, 1935 |
| 1,646,288 | Graham | Oct. 18, 1927 |
| 1,976,258 | Hollingsworth | Oct. 9, 1934 |
| 1,986,149 | Harris | Jan. 1, 1935 |
| 2,167,984 | Leighton | Aug. 1, 1939 |
| 2,238,879 | Dauben | Apr. 22, 1941 |
| 2,405,458 | Slack et al. | Aug. 6, 1946 |